United States Patent [19]
Abe

[11] Patent Number: 5,239,531
[45] Date of Patent: Aug. 24, 1993

[54] OPTICAL INFORMATION RECORDING METHOD USING MODULATED OPTICAL BEAM

[75] Inventor: Michiharu Abe, Yokohama, Japan
[73] Assignee: Ricoh Company, Ltd., Tokyo, Japan
[21] Appl. No.: 713,951
[22] Filed: Jun. 11, 1991

[30] Foreign Application Priority Data

Jun. 18, 1990 [JP] Japan ................................. 2-159068

[51] Int. Cl.⁵ .............................................. G11B 7/00
[52] U.S. Cl. .................................................. 369/109
[58] Field of Search ................. 369/109, 116, 59, 124, 369/100; 346/76 L

[56] References Cited

U.S. PATENT DOCUMENTS

| 4,234,897 | 11/1980 | Miller | 360/45 |
|---|---|---|---|
| 4,425,637 | 10/1981 | Tanaka et al. | |
| 4,979,162 | 12/1990 | Kimoto et al. | 369/116 |
| 4,998,237 | 3/1991 | Osakabe et al. | 369/109 |
| 5,084,857 | 1/1992 | Miyauchi et al. | 369/116 |

FOREIGN PATENT DOCUMENTS 185250 8/1987 Japan.

OTHER PUBLICATIONS

Atsushi Saito, et al.; "High storage density optical disks using pit-edge recording on PbTeSe thin film"; Applied Optics; vol. 27, No. 20; Oct. 15, 1988; pp. 4274-4278.

Primary Examiner—Donald E. McElheny, Jr.
Attorney, Agent, or Firm—Cooper & Dunham

[57] ABSTRACT

An optical information recording method for recording one of signals "1" and "0" in each of bit positions alloted at regular intervals along a track of a recording medium. The method comprises the step of enhancing energy for recording a bit of "1" which is directly subsequent to a bit of "0" in comparison to energy for recording a bit of "1" which is directly subsequent to a bit of "1".

11 Claims, 4 Drawing Sheets 0 0 1 0 1 0 1 0 0 0 1 1 1 0 0 0    ( a )

( b )

( c )

( d )

⟶ POSITION ALONG TRACK

→ POSITION ALONG TRACK

→ POSITION ALONG TRACK

OPTICAL INFORMATION RECORDING METHOD USING MODULATED OPTICAL BEAM

BACKGROUND OF THE INVENTION

1. Field of the Invention

The present invention relates to a method for recording optical information which is suitably applied to an optical information read/write device such as an optical disk device, especially a read/write device which records optical marks with the use of the laser beam heat generated by irradiating the laser beam on the recording medium.

2. Description of the Related Art

An optical information read/write device records optical information data in such a way that a laser beam is irradiated on a recording medium so that the optical energy is absorbed by the recording medium film and that the optical energy involves the thermal function which forms holes in the film, changes the crystalline structure of the film or the magnetized direction of the film, or deforms the recording film so as to write optical marks on the recording medium. Such a method for recording the optical marks has been developed these days and applied to an optical disk device or a magneto-optical disk device. Such an optical device has advantages that the recording density is very high and the memory capacity is very large. Therefore, the device has been widely used as an external memory device.

The memory capacity of an optical disk device of today is 300 to 500 MB (megabyte) in one side of the disk of 130 mm diameter. However, it is required to further enlarge the memory capacity to the extent more than 1000 MB for the same size disk.

For that purpose, it becomes very important to heighten the recording linear density and the track density. However, for this purpose, if simply the interval of the recording position is shortened or the track pitch is narrowed, the signal interference between the adjacent marks becomes enlarged. Therefore, an only effective way for heightening the recording linear density or the track density has been to reduce the spot diameter of the optical beam for reading and writing the information data.

However, such a method of reducing the optical spot diameter is limited from the stand point of design of the optical system construction.

SUMMARY OF THE INVENTION

It is therefore an object of the present invention to provide an optical information recording method in which the above-mentioned drawbacks are obviated and it becomes possible to raise the information recording density.

The above-mentioned object of the present invention can be achieved by an optical information recording method for recording one of signals "1" and "0" in each of bit positions alloted at regular intervals along a track of a recording medium, the method comprising the step of enhancing energy for recording a bit of "1" which is directly subsequent to a bit of "0" in comparison to energy for recording a bit of "1" which is directly subsequent to a bit of "1".

In accordance with the present invention, it is arranged in such a way that the optical beam irradiating energy is increased only for the mark which has no preceding mark recorded at the adjacent front position thereof.

An advantage of the present invention, therefore, is that it becomes possible to raise the recording density to the extent twice as large as the prior art so that it becomes possible to discriminate the mark with the track pitch of 0.8 μm whereas 1.6 μm of the track pitch was necessary to discriminate the mark in accordance with the prior art.

The present invention is especially advantageous when the track pitch is within a range of 0.8 to 1.5 times of the half-beam diameter. However, it is possible to apply the present invention for the normal track pitch, that is, in the range of 1.6 to 2 times of the half-beam diameter.

Further objects and advantages of the present invention will be apparent from the following description of the preferred embodiments of the invention as illustrated in the accompanying drawings.

BRIEF DESCRIPTION OF THE DRAWINGS

FIG. 1 is an explanatory view for explaining a state of marks recorded in tracks of a recording medium of an optical information recording device;

FIG. 2 is an explanatory view for explaining another state of marks recorded in tracks of the recording medium of the optical information recording device;

DESCRIPTION OF THE PREFERRED EMBODIMENTS

Figure 3A:
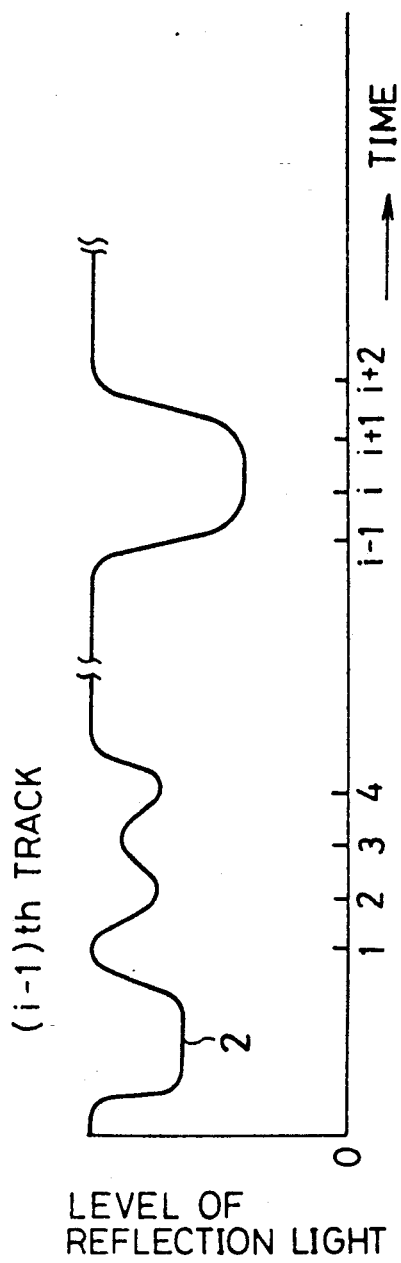
FIG. 3a is a graphical view of an example of reading signal detected from one track of the recording medium.

Embodiments of the present invention are described hereinafter with reference to the drawings in detail and in comparison to the related art which is also described referring to the drawings.

Figures 1, 2:
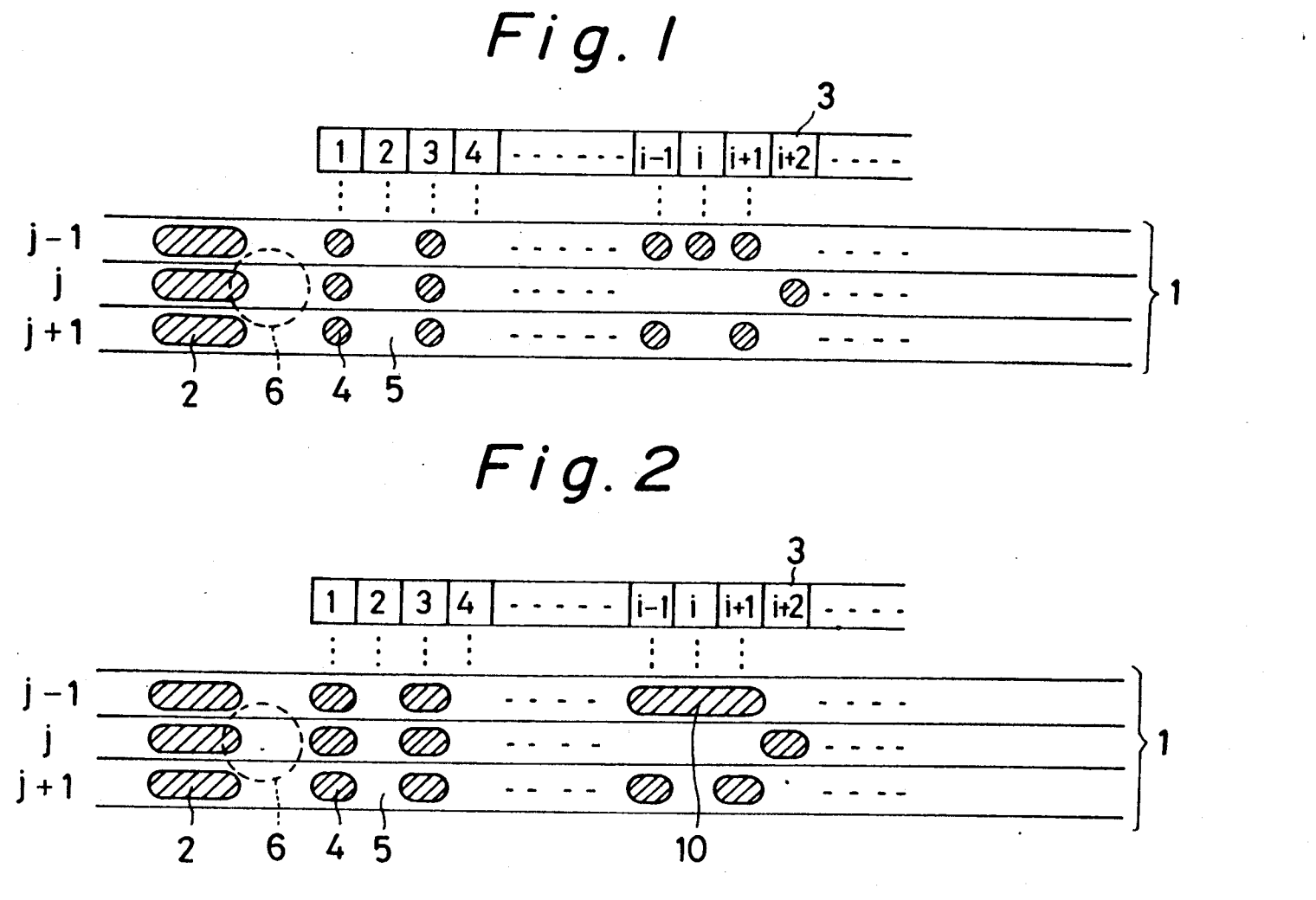

First, an example of the optical information recording method is described with reference to FIGS. 1 to 3.

FIG. 1 illustrates tracks of a recording medium in which marks are written. In FIG. 1, numeral 1 designates tracks for recording information data. The tracks 1 are separated by a predetermined pitch. A (J−1)th track, a jth track and a (j+1)th track are depicted in the drawing. Numeral 2 designates a synchronization mark. On the basis of the mark 2, a recording positions 3 for recording whether the optical mark is recorded or not are alloted at predetermined constant intervals, in order as $1, 2, 3, 4, \ldots, i-1, i, i+1, i+2, \ldots$, as illustrated in the drawing.

Numeral 4 designates an optical mark which corresponds to a bit "1". Whereas numeral 5 designates a space where the optical mark is not recorded and the space 5 corresponds to a bit "0".

When the marks 4 are formed continuously in series, they are likely to connect together to form a longitudinal mark 10 as illustrated in FIG. 2. Numeral 6 designates an optical beam spot.

The size of the beam spot 6 is usually about 0.9 μm of diameter at half maximum when the beam is a laser beam of 780 nm wavelength and converged by a condenser lens having numerical aperture of 0.5. Therefore, if the track pitch is reduced to 0.8 μm which is half of the normal pitch of 1.6 μm, signal noizes are added to the reading signal to be detected from the adjacent tracks so that 10 to 50% of cross-talk amount is included in the signal. As a result, it becomes difficult to discriminate the presence of the optical marks.

Figure 3B:
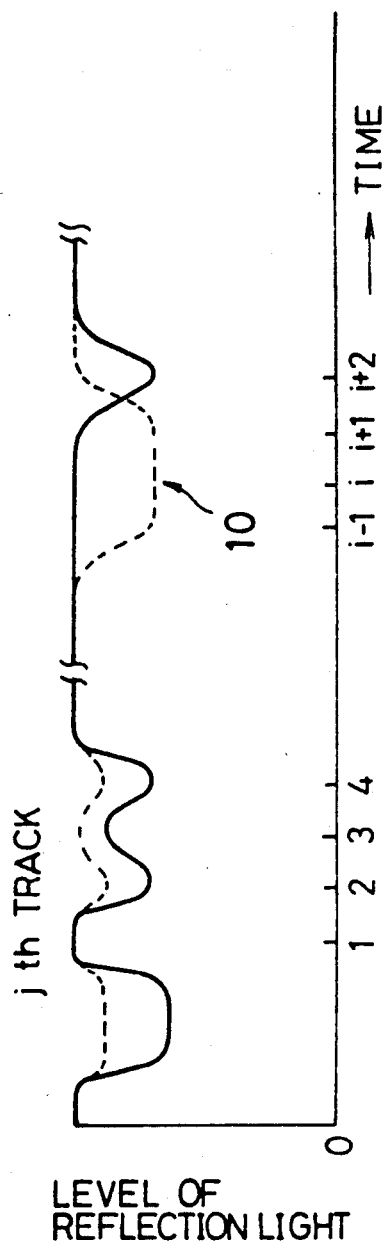
FIG. 3b is a graphical view of another example of reading signal detected from another track of the recording medium.

FIGS. 3a and 3b illustrate the reading signals detected from the tracks for discriminating the presence of the marks.

By scanning the (j−1)th track of FIG. 1 with the use of the laser spot 6, a reading signal, as illustrated in FIG. 3a, is obtained which signal has a form corresponding to the mark 2 and the presence of the mark in each of the positions 1, 2, 3, ... i−1, i, i+1, ... When the marks are continuously formed, the signal level of that portion is enhanced in comparison to the signal level of a single mark, which makes it easy to discriminate the presence of the marks.

On the other hand, the reading signal obtained from the reflection light of the beam spot 6 reflected from the jth track is represented as illustrated in FIG. 3b. The cross-talk from the (j−1)th track is represented by dash line in FIG. 3b. The cross-talk signal is enhanced at the portion where the marks are continuously formed, which makes it difficult to reliably discriminate the presence of the marks. Therefore, it is limited to increase the recording density.

To cope with this problem, the inventor made the invention in which the improvement resides in that the cross-talk generated when the track pitch is narrowed is reduced so that the recording density is heightened.

More precisely, in accordance with the present invention, there is provided an optical information recording method for recording an optical information data in such a way that an optical beam is modulated and irradiated to positions at predetermined period of intervals Δx along an information track of an optical information recording medium on which a plurality of information tracks are formed at predetermined intervals, so that information data marks for discriminating the presence of optical marks are formed, wherein the optical beam irradiation energy E(i) for forming an optical mark at the i-th position numbering the positions for discriminating the presence of optical marks as 1, 2, ..., i−1, i, i+1, ..., in order is represented by $$E(i) = E_0 \times [1 + k\{1 - \delta(i-1)\}]$$

wherein $E_0$ represents a predetermined energy value, $\delta(i-1)$ is 1 when the mark is formed while $\delta(i-1)$ is 0 when the mark is not formed, $0.05 \leq k \leq 0.70$, and i represents an any positive whole number.

The energy E(i) can be set as mentioned above, for example, by such a way that the irradiation time of the optical beam is controlled and adjusted while maintaining the beam power constant or instead that the beam power is controlled and adjusted while maintaining the beam irradiation time constant.

An optical information recording method is explained below with reference to FIG. 4.

In the drawing, (a) represents whether the mark is to be presented or not at each of the positions allotted on the track at regular intervals of Δx. The position where the mark is to be formed is represented by "1", whereas the position where the mark is not to be formed is represented by "0".

The graph (b) represents the optical intensity of the laser beam which is modulated on the basis of the signal of (a). At the position where the mark is to be formed, the laser intensity is enhanced for a predetermined time to record the mark on the track. The predetermined time is determined by dividing the interval period Δx by the scanning speed of the laser spot.

Figure 4:
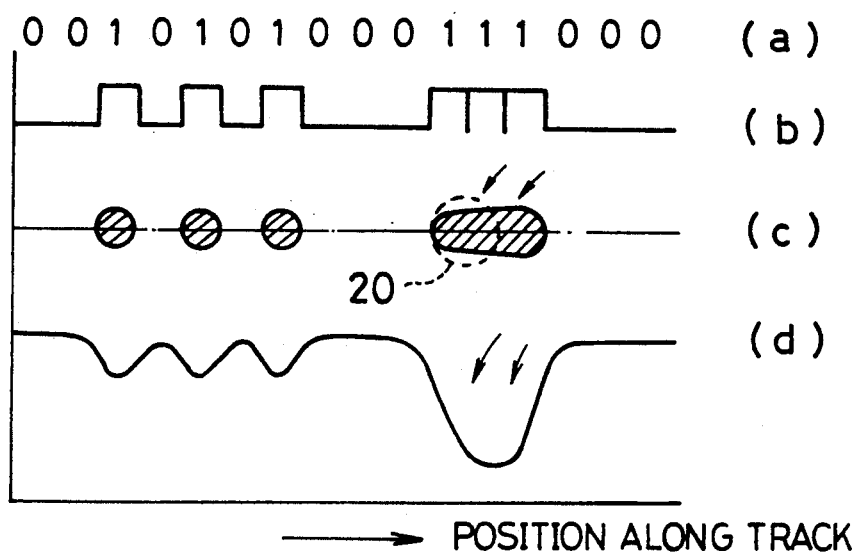
FIG. 4 is an explanatory view for explaining a method of recording marks according to the related art.

The part (c) of FIG. 4 represents the marks recorded on the track. At the portion where three marks are continuously formed, the second and third marks (indicated by arrows) are more strongly recorded than the first mark.

The graph (d) represents the reading signal of the marks recorded on the track obtained by detecting the reflection light from the track. In this graph also, at the portion where three marks are continuously formed, the amplitude of the signal corresponding to the second and third marks is extraordinary enhanced.

The above-mentioned enhancement of reading signal amplitude is considered to cause the cross-talk transmitted to the adjacent tracks. More precisely, the reason for the cross-talk is considered as follows.

The marks can be sorted to two types, one being the mark which has no mark formed preceding right before the mark adjacent thereto and the other being the mark which has a mark formed preceding right before the mark adjacent thereto. With respect to the former type of mark, the recording energy is applied solely from the optical pulse for recording the mark. Whereas with regard to the latter type of mark, the mark maintains the energy for recording the preceding mark and in addition to the remaining energy which the mark is still holding, the optical pulse applies the energy to the portion to record the mark. That is, the second type of mark is given more energy than the first type of mark. As a result, the continuous marks are more strongly recorded than the sole mark, which makes the reading signal level unnecessarily large and causes to give cross-talks to the signals of adjacent tracks.

Such a cross-talk phenomenon may be caused by that the mark is two small in comparison to the size of the optical spot 20. However, it is necessary to reduce the mark size to raise the recording density.

In accordance with the present invention, as mentioned above, the recording method is characterized in that the optical beam irradiation energy is enhanced for recording the mark which has no preceding mark formed right before the mark adjacent thereto.

Figure 5:
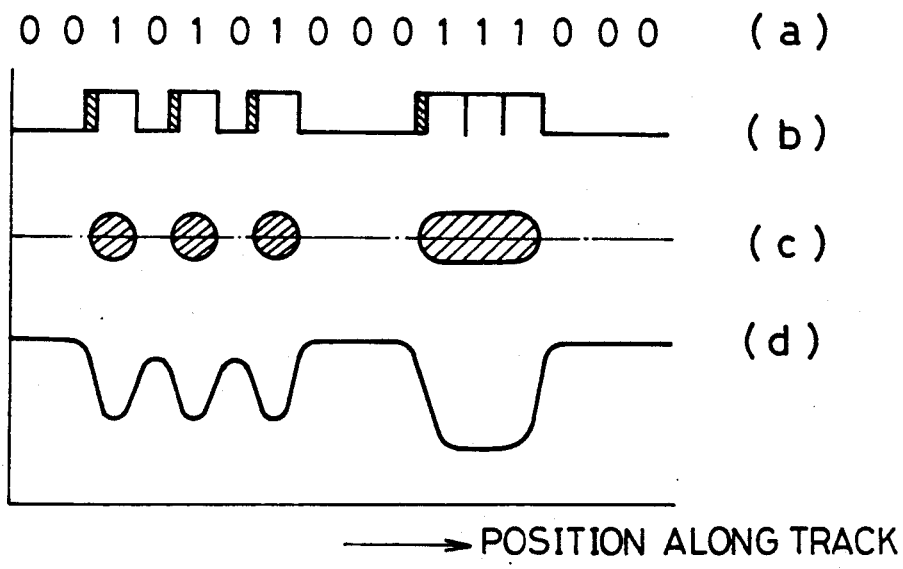
FIG. 5 is an explanatory view for explaining a method of recording marks according to the present invention.

FIG. 5 illustrates an embodiment of the present invention. In this embodiment, a widened pulse the pulse width of which is elongated as illustrated by the shadow portion of (b) in FIG. 5 is irradiated to the mark of bit "1" which is behind and adjacent to the mark of bit "0". Due to such an arrangement, the optical energy is enhanced for the independent sole marks and for the leading mark of continuous marks, which evens the strength of the mark signal so that the cross-talk from the adjacent tracks can be reduced.

In the equation of optical beam irradiation energy E(i) mentioned above, the range of k is defined as from 0.05 to 0.70. This is because if the value of k is out of this range, it becomes difficult to attenuate the cross-talk from the adjacent tracks.

Figure 6:
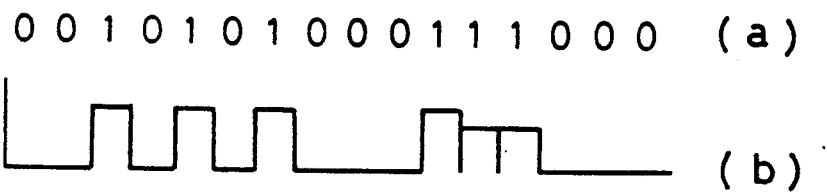
FIG. 6 is an explanatory view for explaining the pulse form for increasing the optical beam irradiation energy by raising the optical power.

It is to be noted that in the above-mentioned embodiment, the pulse width is enlarged to enhance the optical energy E(i) of the beam. However, instead of such an arrangement, the optical power may be strengthened to enhance the energy E(i), as illustrated in FIG. 6. In the embodiment of FIG. 6, the pulse height (power of the pulse) is increased instead of increasing the pulse width as is the case of the embodiment of FIG. 5.

Figure 7:
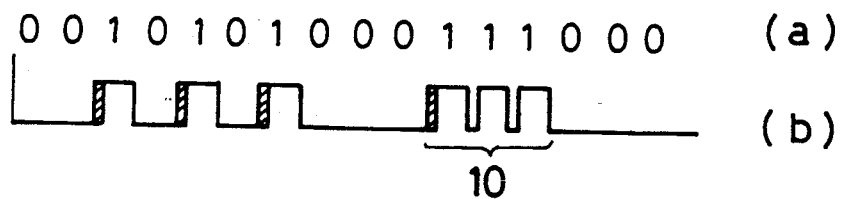
FIG. 7 is an explanatory view for explaining another embodiment of the present invention.

FIG. 7 illustrates another embodiment of the present invention.

In this embodiment, the pulse width corresponding to $E_0$ is shorter than the interval of bits. Therefore, in the portion 10 where the marks are continuously formed, each pulse is separated from the other pulses. As in the embodiments mentioned above, the shadow portion is added to each of the sole pulses and the leading pulse of the continuous pulses.

Figure 8:
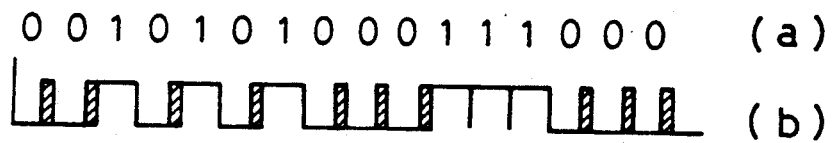
FIG. 8 is an explanatory view for explaining still another embodiment of the present invention.

FIG. 8 illustrates still another embodiment of the present invention.

In this embodiment, an optical pulse is added to the rear end of each bit "0" having no mark formed. In this case, the width of the additional pulse has to be less than the threshold level of recording the mark. Due to this arrangement, it becomes possible to equalize the temperature condition of the mark to be recorded irrespective of whether a preceding mark is formed right before the mark or not. In accordance with the embodiment of FIG. 8, the interference between the mark signals is further minimized since the mark is recorded considering not only the bit directly right before the mark but also the bit before the direct preceding bit.

The embodiment of the present invention is numerically exemplified below to represent the effect of the present invention.

Optical Beam Diameter:
0.9 μm in diameter at half maximum.
Beam wavelength 780 nm, converged by lens of 0.50 N.A.
Track Pitch:
0.8 μm.
Optical Recording Medium:
Optical disk of 130 mm diameter made from polycarbonate substrate coated with cyanine dye of 70 nm thick.
Optical Beam Scanning Speed:
7 m/sec
Laser Power:
5 mW
Interval Period of Mark Positions Δx:
0.75 μm
Standard Pulse Width:
0.75/7 (μ sec) which gives $E_O$ of the invention.

The evaluation result is represented in the following table which shows the signal level difference in the relative value between the bit "1" and the bit "0" changing the value of k.

Note that the case k=0 corresponds to the prior art.

The k value is changed by changing the width of additional pulse (shadow portion illustrated in part (b) of FIG. 5) for recording the specific mark.

| k value in $E_0$ | Relative value of signal level difference between "1" and "0" |
| --- | --- |
| 0 | 0.05 |
| 0.05 | 0.15 |
| 0.10 | 0.30 |
| 0.15 | 0.45 |
| 0.20 | 0.60 |
| 0.25 | 0.70 |
| 0.30 | 0.70 |
| 0.35 | 0.65 |
| 0.40 | 0.60 |
| 0.45 | 0.50 |
| 0.50 | 0.40 |
| 0.55 | 0.30 |
| 0.60 | 0.20 |
| 0.70 | 0.10 |
| 0.80 | 0.05 |

As can be seen from the table, good results are obtained when k value is from 0.05 to 0.70 in comparison to the prior art. It is especially desirable when k value is from 0.10 to 0.50.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical information recording method for recording bits of "1" and "0" in bit positions allotted at a regular interval along a track of a recording medium by forming optical marks along said track with an optical beam, a bit position formed with an optical mark corresponding to said bit of "1", a bit position formed with no optical mark corresponding to said bit "0", said method for recording said bits of "1" and "0" comprising the steps of:

modulating an optical beam according to the bits desired to be recorded and irradiating said modulated optical beam on said bit positions along said track, wherein the energy of said modulated optical beam is greater when recording a bit of "1" at a bit position which is directly subsequent to a bit of "0" than when recording a bit of "1" at a bit position which is directly subsequent to a bit of "1".

2. An optical information recording method according to claim 1, wherein said modulating and irradiating comprises applying an optical pulse at said bit position on the recording medium to form a bit of "1".

3. An optical information recording method according to claim 2, wherein said modulating and irradiating comprises making said pulse wider when recording said bit of "1" at a bit position which is directly subsequent to the bit of "0" than when recording a bit of "1" at a bit position which is directly subsequent to a bit of "1".

4. An optical information recording method according to claim 2, wherein said modulating and irradiating comprises making said pulse higher in amplitude when recording said bit of "1" at a bit position which is directly subsequent to the bit of "0" than when recording a bit of "1" at a bit position which is directly subsequent to a bit of "1".

5. An optical information recording method according to claim 2, wherein said modulating and irradiating comprises making the width of said pulse for recording the bit of "1" at a bit position which is directly subsequent to the bit of "1" narrower than said regular interval at which said bit positions are allotted.

6. An optical information recording method according to claim 2, wherein said modulating and irradiating further comprises applying a pulse, which is weaker than a threshold level for recording a mark, at a bit position on the recording medium when recording a bit of "0".

7. An optical information recording method according to claim 1, wherein said modulating comprises making the energy of said modulated optical beam when recording a bit of "1" at a bit position which is directly subsequent to a bit of "0" equal to $E_o(1+k)$ in which $E_o$ is the energy of said modulated optical beam when recording a bit of "1" which is directly subsequent to the bit of "1" and the k value is represented by $0.05 \leq k \leq 0.70$.

8. An optical information recording method according to claim 3, wherein the width of said pulse for recording the bit of "1" at a bit position which is directly subsequent to the bit of "1" is narrower than said regular interval at which said bit positions are allotted.

9. An optical information recording method according to claim 4, wherein the width of said pulse for recording the bit of "1" at a bit position which is directly subsequent to the bit of "1" is narrower than said regular interval at which said bit positions are allotted.

10. An optical information recording method according to claim 3, wherein said modulating and irradiating comprises applying a pulse, which is weaker than a threshold level for recording a mark, at a bit position on the recording medium when recording a bit of "0".

11. An optical information recording method according to claim 4, wherein said modulating and irradiating comprises applying a pulse, which is weaker than a threshold level for recording a mark, at a bit position on the recording medium when recording a bit of "0".

* * * * *